May 14, 1940.  W. J. McGOLDRICK ET AL  2,200,241
TEMPERATURE CONTROL SYSTEM
Filed Jan. 7, 1939
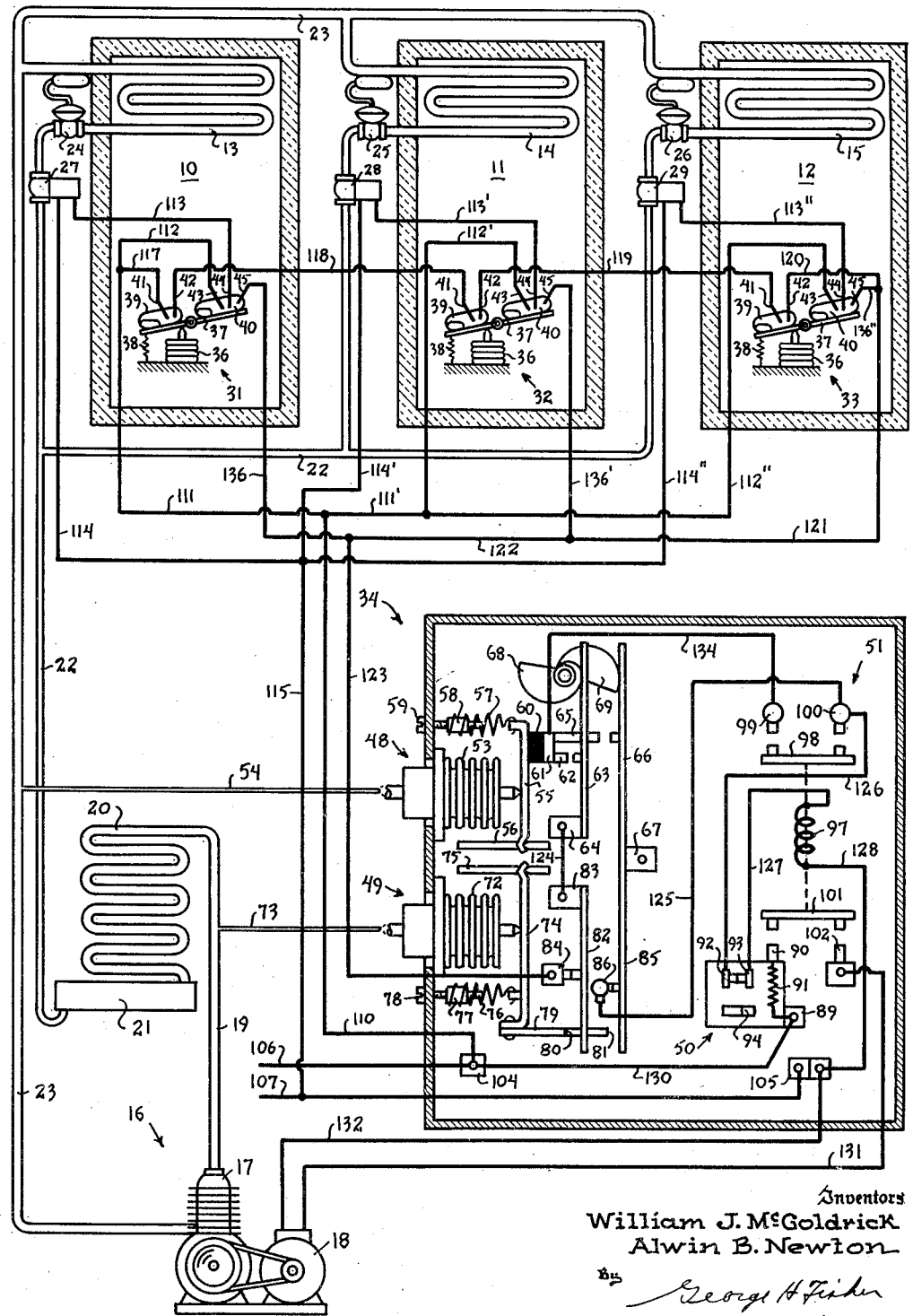
Inventors
William J. McGoldrick
Alwin B. Newton
By George H Fisher
Attorney Patented May 14, 1940

2,200,241

UNITED STATES PATENT OFFICE 2,200,241

TEMPERATURE CONTROL SYSTEM

William J. McGoldrick and Alwin B. Newton, Minneapolis, Minn., assignors to Minneapolis-Honeywell Regulator Company, Minneapolis, Minn., a corporation of Delaware Application January 7, 1939, Serial No. 249,764

14 Claims. (Cl. 62—4)

This invention relates in general to temperature control systems for maintaining desired temperature conditions in a plurality of spaces and more particularly to a temperature control system for a refrigerating apparatus for maintaining desired temperature conditions in a plurality of spaces or fixtures being cooled.

An object of this invention is to provide a control system for a temperature changing apparatus which regulates the temperature in a plurality of spaces wherein the temperature changing apparatus is operated when the temperatures in all of the spaces deviate to predetermined values and wherein the temperature changing apparatus is operated if the temperature in any space deviates beyond the predetermined value.

Another object of this invention is to provide a control system for a multiple fixture refrigerating apparatus having thermostatic control means responsive to the temperature of the fixtures and control means responsive to evaporator temperatures to operate the refrigerating apparatus upon a call for cooling by the thermostatic control means and to defrost the evaporators upon each cycle of operation of the refrigerating apparatus wherein the refrigerating apparatus is placed in operation when the temperatures in all of the fixtures increase to predetermined values and wherein the refrigerating apparatus is placed in operation when the temperature in any fixture increases above the predetermined values. This sequence of temperature control causes all of the fixtures to heat and cool substantially together so that the refrigerating apparatus is not maintained in continuous operation whereby periodic defrosting of the evaporators is assured.

Other objects reside in the structure and manner of accomplishing the above sequences of control.

For a more thorough understanding of this invention, reference is made to the accompanying drawing in which is diagrammatically illustrated the preferred form of this invention.

Although the control system of this invention may be equally as well applied to any type of temperature changing system, such as a heating system, it is shown as applied to a multiple fixture refrigerating system for maintaining desired temperature conditions in a plurality of fixtures or spaces 10, 11 and 12 which may take the form of rooms, walk-in boxes, storage compartments, soda fountains, or the like. The fixtures or spaces 10, 11 and 12 are cooled by cooling coils 13, 14 and 15, respectively, which preferably take the form of evaporators. Refrigerant is supplied to and withdrawn from the evaporators 13, 14 and 15 by means of a refrigerating apparatus, generally designated at 16, which may comprise a compressor 17 operated by an electric motor 18. Compressed refrigerant flows from the compressor 17 through a high pressure line 19 into a condenser 20 and condensed refrigerant is collected in a receiver 21. Liquid refrigerant flows from the receiver 21 through a liquid line 22 into the evaporators 13, 14 and 15, and evaporated refrigerant is withdrawn from the evaporators 13, 14 and 15 through a suction line 23 by the compressor 17. It is here noted that the evaporators 13, 14 and 15 are arranged in parallel. The flow of refrigerant into the evaporators 13, 14 and 15 is regulated by expansion valves 24, 25 and 26, respectively, which may take the form of thermostatic expansion valves of a conventional type. Since the above outlined structure is conventional in the art, a further description thereof is not considered necessary, it being sufficient to state that when the compressor 17 is placed in operation refrigerant is supplied to the evaporators 13, 14 and 15 to perform a cooling function.

The supply of refrigerant to the evaporators 13, 14 and 15 is controlled by solenoid valves 27, 28 and 29, respectively, the arrangement being such that when the solenoid valves are opened and the compressor is in operation refrigerant is supplied to the evaporators and when the solenoid valves are closed the supply of refrigerant to the evaporators is interrupted. The solenoid valves 27, 28 and 29 are controlled by thermostatic control means 31, 32 and 33 responsive to the temperature in the fixtures 10, 11 and 12, respectively. The compressor motor 18 and hence the compressor 17 are controlled by the thermostatic control means 31, 32 and 33, and in addition the compressor motor 18 and hence the compressor 17 are controlled by a unitary control arrangement generally designated at 34, this unitary control arrangement being operated in accordance with changes in suction pressure and head pressure.

The thermostatic control means 31 may comprise a bellows 36 charged with a volatile fluid for operating a lever 37 against the action of an adjustable tension spring 38. The lever 37 in turn operates mercury switches 39 and 40, the mercury switch 39 having electrodes 41 and 42 which are bridged upon a temperature rise and the mercury switch 40 having electrodes 43, 44 and 45 which are also bridged upon a temperature rise. For purposes of illustration it is assumed that the parts are so arranged that when the temperature within the fixture 10 rises to 42°, the mercury switches 39 and 40 are tilted to a position to cause bridging of the electrodes 41 and 42 and bridging of the electrodes 43 and 44. It is here noted that the electrode 45 is shorter than the electrodes 43 and 44 so that the electrode 45 is not bridged until such time as the temperature within the fixture 10 increases to, say 44°. At 44° electrodes 41 and 42 are bridged and the electrodes 43, 44 and 45 are bridged. When the temperature within the fixture 10 decreases to 40°, the mercury switches 39 and 40 are tilted to the position shown in the drawing to unbridge the electrodes. The thermostatic control means 32 and 33 are exactly the same as the thermostatic control means 31 and therefore like reference characters for like parts have been utilized. It is of course obvious that the temperature settings of the thermostatic control means 32 and 33 may be other than that of the thermostatic control means 31 so that any desired temperature may be maintained within the various fixtures.

The unitary control arrangement 34 may be of the type shown and described in application Serial No. 196,447 filed by Albert L. Judson and Carl G. Kronmiller on March 17, 1938. For purposes of illustration in this application the unitary control arrangement 34 is shown to comprise a switching mechanism generally designated at 48 responsive to variations in suction pressure, a switching mechanism generally designated at 49 responsive to variations in head pressure, an overload cut-out generally designated at 50, and a relay or starter generally designated at 51.

The switching mechanism responsive to variations in suction pressure may comprise a bellows 53 connected by a pipe 54 to the suction line 23 so that the bellows 53 is expanded and contracted in accordance with variations in suction pressure. The bellows 53 operates a lever 55 fulcrumed on fulcrum member 56 against the action of an adjustable tension spring 57. One end of the tension spring 57 is connected to the lever 55 and the other end is connected to a nut 58 screw-threadedly mounted on a screw 59. By rotating the screw 59 the tension in the spring 57 may be varied and hence the pressure setting of this portion of the instrument may be adjusted. Lever 55 carries an insulating pad 60 upon which is mounted a bridge member 61 for operating contacts 62 and 65. The contact 62 is adapted to engage a contact member 63 suitably mounted on a terminal 64 and the contact 65 is adapted to engage a contact member 66 suitably mounted on a terminal 67. The relative positions of the contact members 63 and 66 may be adjusted by means of concentrically mounted cams 68 and 69 which are independently adjustable. For purposes of illustration it is assumed that when the suction pressure increases to 10 lbs. contact 62 engages contact member 63, and when the suction pressure increases to 35 lbs. contact 65 engages contact member 66. Upon a decrease in suction pressure contact 65 first disengages contact member 66 at 35 lbs. and then contact 62 disengages contact member 63 at 10 lbs.

The switching mechanism 49 responsive to variations in head pressure may comprise a bellows 72 connected by a pipe 73 to the high pressure line 19 so that the bellows 72 is expanded and contacted in accordance with variations in head pressure. The bellows 72 operates a lever 74 fulcrumed on a fulcrum member 75 against the action of an adjustable tension spring 76. One end of the tension spring 76 is connected to the lever 74 and the other end is connected to a nut 77 screw-threadedly mounted on a screw 78. By rotating the screw 78 the tension in the spring 76 is varied and hence the pressure setting of this portion of the unitary control arrangement may be adjusted at will. The lever 74 adjustably carries an abutment member 79 provided with abutments 80 and 81. The abutment 80 is adapted upon a pressure increase to engage a contact member 82 carried by a terminal 83 to separate the contact member 82 from a stationary contact 84. The abutment member 81 is adapted upon a pressure increase to engage a contact member 85 carried by the terminal 67 to cause the contact member 85 to disengage a stationary contact 86. For purposes of illustration it is assumed that upon a pressure increase the contact member 85 first disengages the contact 86 at 140 lbs. and then the contact member 82 disengages the contact 84 at 190 lbs. Upon a decrease in head pressure the contact member 82 first engages the contact 84 at 190 lbs. and then the contact member 85 engages the contact 86 at 140 lbs.

The overload cut-out 50 may comprise a terminal 89 and a contact 90 between which is mounted a heater element 91. The heater element 91 operates upon an excessive current flow therethrough, a bimetallic element, not shown, for tripping a latch to separate contacts 92 and 93. Hence the contacts 92 and 93 are separated upon an overload condition. The contacts 92 and 93 may be reclosed by means of a manual lever 94.

The relay or starter 51 may comprise an operating coil 97 for operating a bridge member 98 with respect to contacts 99 and 100 and a bridge member 101 with respect to contacts 90 and 102. When the operating coil 97 is energized the bridge member 98 is moved into engagement with the contacts 99 and 100 and the bridge member 101 is moved into engagement with contacts 90 and 102. When the operating coil 97 is deenergized the bridge members 98 and 101 are moved out of engagement with their respective contacts by means of springs, gravity, or other means not shown.

The unitary control arrangement 34 also includes terminals 104 and 105 which are connected to line wires 106 and 107 leading from some source of power, not shown. The line wires 106 and 107 supply power to the compressor motor 18, the solenoid valves 27, 28 and 29, and to the control system.

Assume now that the temperature within the fixture 10 increases to 42° to cause the electrodes 41 and 42 and the electrodes 43 and 44 to be bridged. A circuit is thereupon completed from the line wire 106 through terminal 104, wires 110, 111 and 112, electrodes 43 and 44, wire 113, solenoid valve 27 and wires 114 and 115 back to the other line wire 107. Completion of this circuit upon a temperature increase to 42° energizes the solenoid valve 27 to open the same. The thermostatic control means 32 and 33 of the fixtures 11 and 12 control their solenoid valves 28 and 29 respectively, in exactly the same manner as the thermostatic control means 31 controls its solenoid valve 27 and therefore like reference characters primed and double primed have been utilized for like wiring connections. A further description, therefore, of the operation of the solenoid valves 28 and 29 is not considered necessary, it being sufficient to state that when the temperatures within the fixtures 11 and 12 increase to predetermined values the solenoid valves 28 and 29 are opened.

Assume now that the head pressure decreases to 140 lbs. to cause the contact member 82 to engage the contact 84 and the contact member 85 to engage the contact 86, that the suction pressure increases to 35 lbs. to cause the contact 62 to engage the contact member 63 and the contact 65 to engage the contact member 66, and that the temperatures within all of the fixtures 10, 11 and 12 increase to the predetermined values, illustratively 42°. A circuit is thereupon completed from the line wire 106 through terminal 104, wires 110, 111 and 117, electrodes 41 and 42 of the thermostatic control means 31, wire 118, electrodes 41 and 42 of the thermostatic control means 32, wire 119, electrodes 41 and 42 of the thermostatic control means 33, wires 120, 121, 122 and 123, contact 84, contact member 82, terminal 83, conductor 124, terminal 64, contact member 63, contact 62, bridge member 61, contact 65, contact members 66 and 85, contact 86, conductor 125, contact 100, conductor 126, contacts 92 and 93, conductor 127, operating coil 97, conductor 128 and terminal 105 back to the other line wire 107. Completion of this circuit energizes the operating coil 97 to move the bridge member 98 into engagement with its contacts 99 and 100 and to move the bridge member 101 into engagement with its contacts 90 and 102.

Movement of the bridge member 101 into engagement with its contacts 90 and 102 completes a load circuit for the compressor motor 18 which may be traced from the line wire 106 through terminal 104, conductor 130, terminal 89, heater element 91, contact 90, bridge member 101, contact 102, wire 131, compressor motor 18, wire 132 and terminal 105 back to the other line wire 107. Completion of this circuit causes operation of the compressor motor 18 and hence the compressor 17. Accordingly, when the temperatures in all of the fixtures increase to predetermined values, illustratively 42°, the compressor 17 is placed into operation providing the suction pressure has increased to 35 lbs. and the head pressure has decreased to 140 lbs. For purposes of illustration it is assumed that a suction pressure value of 35 lbs. represents a defrosting value so that it is impossible to start the compressor 17 until such time as all of the evaporators 13, 14 and 15 have defrosted. It is also impossible to start the compressor until such time as the head pressure decreases to 140 lbs. whereby heavy starting loads on the compressor motor 18 are practically eliminated.

Movement of the bridge member 98 into engagement with the contacts 99 and 100 completes a maintaining circuit for the operating coil 97 of the relay or starter 51 which is independent of contact 65, contact member 66, contact 86, and contact member 85. This maintaining circuit may be traced from the line wire 106 through terminal 104, wires 110, 111 and 117, electrodes 41 and 42 of the thermostatic control means 31, wire 118, electrodes 41 and 42 of the thermostatic control means 32, wire 119, electrodes 41 and 42 of the thermostatic control means 33, wires 120, 121, 122 and 123, contact 84, contact member 82, terminal 83, conductor 124, terminal 64, contact member 63, contact 62, bridge member 61, conductor 134, contact 99, bridge member 98, contact 100, conductor 126, contacts 92 and 93, conductor 127, operating coil 97, conductor 128 and terminal 105 back to the other line wire 107. Completion of this circuit maintains the relay or starter 51 pulled in and hence the compressor 17 in operation until such time as the temperature in any of the fixtures 10, 11 or 12 decreases to 40° to unbridge the electrodes 41 and 42 or until the head pressure increases to 190 lbs. to move the contact member 82 out of engagement with the contact 84 or until the suction pressure decreases to 10 lbs. to move the contact 62 out of engagement with the contact member 63. When any of these contingencies occur to stop the compressor 17, it cannot again be placed in operation until the head pressure decreases to 140 lbs., the suction pressure increases to 35 lbs. indicating that all of the evaporators 13, 14 and 15 have defrosted and until the temperature of all of the fixtures 10, 11 and 12 rise to the predetermined values, illustratively 42°. Defrosting of all of the evaporators 13, 14 and 15 is therefore provided during each cycle of operation of the compressor 17. Since the compressor 17 is not started until the temperature in all of the fixtures 10, 11 and 12 increases to the predetermined value, illustratively 42°, the fixtures 10, 11 and 12 will tend to heat and cool at substantially the same time so that periodic stopping of the compressor and hence periodic defrosting of the evaporators is assured.

If, however, the load in the fixture 10 should suddenly increase to cause the temperature thereof to rise above the predetermined value, say to 44°, the electrodes 43, 44 and 45 of the thermostatic control means 31, are bridged to complete a circuit from the line wire 106 through terminal 104, wires 110, 111 and 112, electrodes 43 and 45 of the mercury switch 40, wires 136 and 123, contact 84, contact member 82, terminal 83, conductor 124, terminal 64, contact member 63, contact 62, bridge member 61, contact 65, contact members 66 and 85, contact 86, conductor 125, contact 100, conductor 126, contacts 92 and 93, conductor 127, operating coil 97, conductor 128 and terminal 105 back to the other line wire 107. Completion of this circuit therefore pulls in the relay or starter 51 to place the compressor 17 in operation even though the temperature within the fixtures 32 and 33 has not risen to the predetermined values of 42°. Accordingly, if the temperature in the fixture 10 should rise above the predetermined value the compressor is placed in operation regardless of the temperatures within the fixtures 11 and 12 so that the existence of high temperatures in the fixture 10 is prevented. Electrodes 45 of the thermostatic control means 32 and 33 operate in exactly the same way as the electrode 45 of the thermostatic control means 31 so that a further description of this operation is not considered necessary, it being sufficient to state that when the temperature in any fixture rises above the predetermined values, say to 44°, the compressor 17 is placed in operation.

Pulling in of the relay or starter 51 by the electrodes 45 of any of the thermostatic control means also completes a maintaining circuit 70 which is independent of the contact members 66 and 85 and the contacts 65 and 84, and this maintaining circuit may be traced from the line wire 106 to wires 110, 111 and 112, electrodes 43 and 45, wires 136 and 123, contact 84, contact member 82, terminal 83, conductor 124, terminal 64, contact member 63, contact 62, bridge member 61, conductor 134, contact 99, bridge member 98, contact 100, conductor 126, contacts 92 and 93, conductor 127, operating coil 97, conductor 128, and terminal 105 back to the other line wire 107. Accordingly, the compressor is maintained in operation until all of the electrodes 45 of the thermostatic control means are unbridged or until the suction pressure decreases to 10 lbs. or until the head pressure increases to 190 lbs.

From the above it is seen that this invention contemplates a control system for a refrigerating apparatus wherein the compressor cannot be started until the head pressure decreases to a predetermined low value of 140 lbs., wherein defrosting of all of the evaporators during each cycle of operation of the compressor is provided since it is impossible to start the compressor until the suction pressure increases to a defrosting value of 35 lbs., and wherein the compressor is started when the temperature in all of the fixtures increases to a predetermined value, illustratively 42°. By preventing during the normal operation of the system starting of the compressor until the temperature in all of the fixtures increases to 42°, the fixtures tend to heat and cool substantially simultaneously so that stopping of the compressor and hence periodic defrosting of all of the evaporators is assured. If due to an increase in load in any of the fixtures which causes the temperature in that fixture to rise above the predetermined value to say 44°, the compressor is placed in operation regardless of the temperature in the remaining fixture providing the evaporators of all of the fixtures have defrosted. This prevents the building up of unduly high temperatures in any of the fixtures. In each instance, when the temperature in a fixture rises to or above the predetermined value, illustratively 42°, the solenoid valve of that fixture is opened so that refrigerant may be supplied to the evaporator of that refrigerator when the compressor is placed in operation.

Although for purposes of illustration one form of this invention has been disclosed, other forms thereof may become apparent to those skilled in the art and therefore this invention is to be limited only by the scope of the appended claims and prior art.

We claim as our invention:

1. In a control system for a temperature changing system having a temperature changing apparatus for regulating the temperature of a plurality of spaces, the combination of, thermostatic means associated with each space and responsive to the temperature thereof, and means including means controlled by the thermostatic means to operate the temperature changing apparatus only when the temperatures of all of the spaces deviate to predetermined values and means controlled by the thermostatic means to operate the temperature changing apparatus when the temperature of any space deviates beyond the predetermined value.

2. In a control system for a temperature changing system having temperature changing means for supplying temperature changing fluid to a plurality of spaces for regulating the temperature thereof, the combination of, thermostatic means associated with each space and responsive to the temperature thereof, valve means associated with each space for controlling the supply of temperature changing fluid to that space, and means including means controlled by the thermostatic means for operating the temperature changing means only when the temperatures of all of the spaces deviate to predetermined values, means controlled by the thermostatic means for operating their associated valve means to supply temperature changing fluid to the associated spaces when the space temperatures deviate to the predetermined values and means controlled by the thermostatic means for operating the temperature changing means when the temperature of any space deviates beyond the predetermined value.

3. In combination, a plurality of heat exchangers for regulating the temperature in a plurality of spaces, means for supplying temperature changing fluid to said heat exchangers, thermostatic means associated with each space and responsive to the temperature thereof, valve means associated with each heat exchanger for controlling the supply of temperature changing fluid thereto, and means including means controlled by the thermostatic means for operating said supplying means only when the temperatures of all of the spaces deviate to predetermined values, means controlled by the thermostatic means for operating their associated valve means to supply temperature changing fluid to the associated heat exchangers when the space temperatures deviate to the predetermined values and means controlled by the thermostatic means for operating said supplying means when the temperature of any space deviates beyond the predetermined value.

4. In a control system for a cooling apparatus for cooling a plurality of spaces, the combination of, thermostatic means associated with each space and responsive to the temperature thereof, and means including means controlled by the thermostatic means to operate the cooling apparatus only when the temperatures of all of the spaces increase to predetermined values and means controlled by the thermostatic means to operate the cooling apparatus when the temperature of any space increases above the predetermined value.

5. In a control system for a refrigerating apparatus having a compressor and a plurality of evaporators for cooling a plurality of fixtures, the combination of, thermostatic means associated with each fixture and responsive to the temperature thereof, and means including means controlled by the thermostatic means for operating the compressor to supply refrigerant to all of the evaporators only when the temperatures of all of the fixtures increase to predetermined values and means controlled by the thermostatic means of any fixture for operating the compressor to supply refrigerant to its associated evaporator when the temperature of that fixture increases above the predetermined value.

6. In a control system for a refrigerating apparatus having a compressor and a plurality of evaporators for cooling a plurality of fixtures, the combination of, thermostatic means associated with each fixture and responsive to the temperature thereof, valve means associated with each evaporator for controlling the flow of refrigerant therethrough, means controlled by each thermostatic means for operating its associated valve means to permit flow of refrigerant through its associated evaporator when the temperature of that fixture rises to or above a predetermined value, and means including means controlled by the thermostatic means for operating the compressor to supply refrigerant to the evaporators only when the temperatures of all of the fixtures increase to said predetermined values and means controlled by the thermostatic means of any fixture for operating the compressor when the temperature of that fixture increases above the predetermined value whereby refrigerant is supplied to the evaporator of that fixture.

7. In a control system for a refrigerating apparatus having a compressor and a plurality of evaporators for cooling a plurality of fixtures, the combination of, thermostatic means associated with each fixture and responsive to the temperature thereof, control means controlled by a condition which is a measure of the temperature of the evaporators, and means including means controlled by the control means and the thermostatic means for operating the compressor to supply refrigerant to the evaporators only when the evaporators have defrosted and when the temperatures of all of the fixtures increase to predetermined values and means controlled by the control means and the thermostatic means of any fixture for operating the compressor when the evaporators have defrosted and the temperature of that fixture increases above the predetermined value.

8. In a control system for a refrigerating apparatus having a compressor and a plurality of evaporators for cooling a plurality of fixtures, the combination of, thermostatic means associated with each fixture and responsive to the temperature thereof, valve means associated with each evaporator for controlling the flow of refrigerant therethrough, means controlled by each thermostatic means for operating its associated valve means to permit flow of refrigerant through its associated evaporator when the temperature of that fixture rises to or above a predetermined value, control means controlled by a condition which is a measure of the temperature of the evaporators, and means including means controlled by the control means and the thermostatic means for operating the compressor to supply refrigerant to the evaporators only when the evaporators have defrosted and when the temperatures of all of the fixtures increase to the predetermined values and means controlled by the control means and the thermostatic means of any fixture for operating the compressor when the evaporators have defrosted and the temperature of that fixture increases above the predetermined value.

9. In a control system for a refrigerating apparatus having a compressor and a plurality of evaporators for cooling a plurality of fixtures, the combination of, thermostatic means associated with each fixture and responsive to the temperature thereof, control means controlled by the pressure on the high pressure side of the refrigerating apparatus, and means including means controlled by the control means and the thermostatic means for operating the compressor to supply refrigerant to the evaporators only when the head pressure has decreased to a predetermined value and when the temperatures of all of the fixtures increase to predetermined values and means controlled by the control means and the thermostatic means of any fixture for operating the compressor when the head pressure has decreased to the predetermined value and the temperature of that fixture increases above the predetermined value.

10. In a control system for a refrigerating apparatus having a compressor and a plurality of evaporators for cooling a plurality of fixtures, the combination of, thermostatic means associated with each fixture and responsive to the temperature thereof, valve means associated with each evaporator for controlling the flow of refrigerant therethrough, means controlled by each thermostatic means for operating its associated valve means to permit flow of refrigerant through its associated evaporator when the temperature of that fixture rises to or above a predetermined value, control means controlled by the pressure on the high pressure side of the refrigerating apparatus, and means including means controlled by the control means and the thermostatic means for operating the compressor to supply refrigerant to the evaporators only when the head pressure has decreased to a predetermined value and when the temperatures of all of the fixtures increase to the predetermined values and means controlled by the control means and the thermostatic means of any fixture for operating the compressor when the head pressure has decreased to the predetermined value and the temperature of that fixture increases above the predetermined value.

11. In a control system for a refrigerating apparatus having a compressor and a plurality of evaporators for cooling a plurality of fixtures, the combination of, thermostatic means associated with each fixture and responsive to the temperature thereof, control means controlled by a condition which is a measure of the temperature of the evaporators, control means controlled by the pressure on the high pressure side of the refrigerating apparatus, and means including means controlled by both control means and the thermostatic means for operating the compressor to supply refrigerant to the evaporators only when the evaporators have defrosted, when the head pressure has decreased to a predetermined value and when the temperatures of all of the fixtures increase to predetermined values and means controlled by both control means and the thermostatic means of any fixture for operating the compressor when the evaporators have defrosted, when the head pressure has decreased to the predetermined value and when the temperature of that fixture increases above the predetermined value.

12. In a control system for a refrigerating apparatus having a compressor and a plurality of evaporators for cooling a plurality of fixtures, the combination of, thermostatic means associated with each fixture and responsive to the temperature thereof, valve means associated with each evaporator for controlling the flow of refrigerant therethrough, means controlled by each thermostatic means for operating its associated valve means to permit flow of refrigerant through its associated evaporator when the temperature of that fixture rises to or above a predetermined value, control means controlled by a condition which is a measure of the temperature of the evaporators, control means controlled by the pressure on the high pressure side of the refrigerating apparatus, and means including means controlled by both control means and the thermostatic means for operating the compressor to supply refrigerant to the evaporators only when the evaporators have defrosted, when the head pressure has decreased to a predetermined value and when the temperatures of all of the fixtures increase to the predetermined values and means controlled by both control means and the thermostatic means of any fixture for operating the compressor when the evaporators have defrosted, when the head pressure has decreased to the predetermined value and when the temperature of that fixture increases above the predetermined value.

13. In a control system for a refrigerating apparatus having a compressor and a plurality of evaporators for cooling a plurality of fixtures, the combination of, thermostatic means associated with each fixture and responsive to the temperature thereof, control means responsive to variations in suction pressure, and means including means controlled by the control means and the thermostatic means for operating the compressor to supply refrigerant to the evaporators only when suction pressure increases to a predetermined value and when the temperatures of all of the fixtures increase to predetermined values and means controlled by the control means and the thermostatic means of any fixture for operating the compressor when the suction pressure increases to the predetermined value and the temperature of that fixture increases above the predetermined value.

14. In a control system for a refrigerating apparatus having a compressor and a plurality of evaporators for cooling a plurality of fixtures, the combination of, thermostatic means associated with each fixture and responsive to the temperature thereof, valve means associated with each evaporator for controlling the flow of refrigerant therethrough, means controlled by each thermostatic means for operating its associated valve means to permit flow of refrigerant through its associated evaporator when the temperature of that fixture rises to or above a predetermined value, control means responsive to variations in suction pressure, and means including means controlled by the control means and the thermostatic means for operating the compressor to supply refrigerant to the evaporators only when suction pressure increases to a predetermined value and when the temperatures of all of the fixtures increase to the predetermined values and means controlled by the control means and the thermostatic means of any fixture for operating the compressor when the suction pressure increases to the predetermined value and the temperature of that fixture increases above the predetermined value.

WILLIAM J. McGOLDRICK.
ALWIN B. NEWTON.